United States Patent [19]

Detwiler

[11] 4,155,170
[45] May 22, 1979

[54] APPARATUS AND GAUGES FOR USE IN MEASURING THE DIAMETER OF A BUFFED TIRE IN RELATION TO A PARTICULAR MATRIX

[75] Inventor: Richard H. Detwiler, North Windham

[73] Assignee: Noyes Tire Co., Westbrook, Me.

[21] Appl. No.: 870,941

[22] Filed: Jan. 20, 1978

[51] Int. Cl.² .............................................. G01B 5/08
[52] U.S. Cl. .............................. 33/172 B; 33/172 C; 33/203.16
[58] Field of Search ............. 33/147 C, 172 B, 172 C, 33/174 Q, 178 R, 178 C, 203, 203.12, 203.15, 203.16

[56] References Cited

U.S. PATENT DOCUMENTS

| | | | |
|---|---|---|---|
| 2,117,841 | 5/1938 | Fitzgerald | 33/172 B |
| 2,636,277 | 4/1953 | Hawkinson | 33/203.16 |
| 2,679,715 | 6/1954 | Heintz | 33/203 |
| 3,007,251 | 11/1961 | Rawls | 33/178 R |
| 3,986,267 | 10/1976 | Taylor | 33/203.16 |

*Primary Examiner*—Richard R. Stearns

[57] ABSTRACT

Gauges are provided to measure the diameter of a buffed tire to determine whether with the addition of a predetermined amount of uncured rubber thereto by an extruder builder, a predetermined mold or matrix can be used, whether additional rubber will have to be applied by the builder before that matrix can be used or whether the buffed tire should not be used with that matrix.

14 Claims, 9 Drawing Figures

APPARATUS AND GAUGES FOR USE IN MEASURING THE DIAMETER OF A BUFFED TIRE IN RELATION TO A PARTICULAR MATRIX

BACKGROUND OF THE INVENTION

One process presently used in retreading tires requires that they be buffed to remove the old tread, then provided with a predetermined layer of uncured rubber and finally placed in an appropriately dimensioned matrix with the uncured rubber then cured at a predetermined temperature for a predetermined time.

In this process, the uncured rubber is applied by a so-called extruder builder having a section provided with a rotatable support for a buffed tire which support is expansible to center and seal the tire with the tire then automatically inflated. A ribbon-like extrusion of uncured rubber is then applied to the tire while it is so rotated and the section so turned on a vertical axis that the buffed area is covered from side-to-side with overlapping turns of uncured rubber until the tire is built up with a wanted thickness thereof. The extrusion may, for example, be one and one-eighth inches wide and three-sixteenths of an inch in thickness but the extruder builder permits adjustments as to both dimensions. Extruder builders are operated on a programmed basis, each program relating tire size to a matrix of particular dimensions and providing for the addition to the tire of a predetermined thickness of uncured rubber.

By way of example, it may be required, when one particumatrix is to be used, that a buffed tire of appropriate size be built up with uncured rubber to a thickness of 11/32nds of an inch but if a winter tread is to be formed, using another matrix, the required built up thickness for that tire would be 14/32nds of an inch.

The problem is that the diameter of buffed tires of the same size may vary and the layer of uncured rubber must be of a predetermined minimum thickness. The matrix for use with tires of one size is fixed so that in the retreading of a group of buffed tires of the same size, there may be some that should not be used as well as some that may require additional uncured rubber. This problem has been recognized and it has been the practice to measure the circumference of uninflated tires and also to take transverse measurements from bead-to-bead to determine whether and under what conditions, a buffed tire can be retreaded.

THE PRESENT INVENTION

The general objective of the present invention is to provide means by which the diameter of a buffed and inflated tire can be quickly and accurately gauged to determine whether or not and under what conditions it can be used with a particular matrix. The gauge may be an attachment for an extruder builder or for a separate unit by which an inflated tire can be supported or it may be an integral part of such a builder or other unit.

The objectives of the invention are attained with a gauge provided with an arm movable along a radial path into engagement with the periphery of an inflated tire with the axis of which the gauge has a predetermined relationship. Each gauge includes scale means provided with a series of successive portions, each for a particular tire diameter and each portion is divided into successive sections all of which relate the actual diameter of the buffed tire, with a predetermined thickness of uncured rubber applied thereto, to a particular matrix. One section establishes that the buffed tire diameter is such that with a normal or standard thickness of uncured rubber applied thereto, it can be used with said matrix. Another section establishes that the matrix can be used if the layer of uncured rubber to be applied is thicker and yet another section establishes that the buffed tire should not be used with said matrix. Each gauge also includes scale readout means, either the scale means or the readout means fixed and the other connected to the arm.

Another objective of the invention is to enable the gauge to be used with tires of different construction, one, by way of example, that is fabric belted and another that is steel belted, an objective attained by providing each portion with corresponding sections for each type of construction and that reflect the difference between them in elasticity.

Another objective of the invention is to enable small movements of the gauging arm to result in relatively large relative movements between the scale means and the readout means, an objective attained, in one embodiment of the invention by providing a gear box with the drive shaft turned by the arm, the scale member in the form of a drum turned by the driven shaft of the gear box and the readout member fixed.

In another embodiment of the invention, this objective is attained with the scale means fixed and arcuate and the readout means a pointer having its axis concentric with the scale means and the gauge provided with means enabling the pointer to be turned against the resistance of a return spring by a member connected to the arm.

In yet another embodiment of the invention, the above objective is attained by utilizing a vertical scale with the readout means including a parallel liquid column, the liquid in which is raised or lowered by the action of a piston-cylinder unit actuated by the arm.

Another embodiment of the invention attains that objective with a vertical scale member and with the readout means a pointer moved vertically relative thereto against the action of a return spring by a tackle actuated by the arm.

Other objectives and features of the invention will be apparent from the following specification and appended claims.

BRIEF DESCRIPTION OF THE DRAWINGS

The accompanying drawings illustrate preferred embodiments of the invention of which

THE PREFERRED EMBODIMENTS OF THE INVENTION

An important advantage of the invention is that it enables the diameter of a buffed but unbuilt tire to be gauged for retreading purposes while inflated and rotatably supported by an extruder builder. Gauges in accordance with the invention are, accordingly preferably used in conjunction therewith. Extruder builders are well known and may be in accordance with U.S. Pat. Nos. 3,177,918 and 3,291,171.

Figure 1:
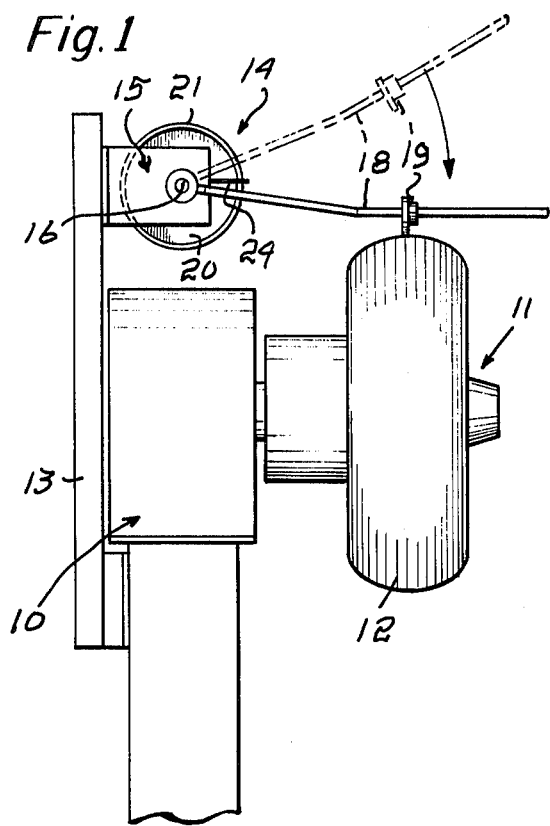
FIG. 1 is a side elevation of a gauge in accordance with one embodiment of the invention mounted for use with an extruder builder.
Figure 2:
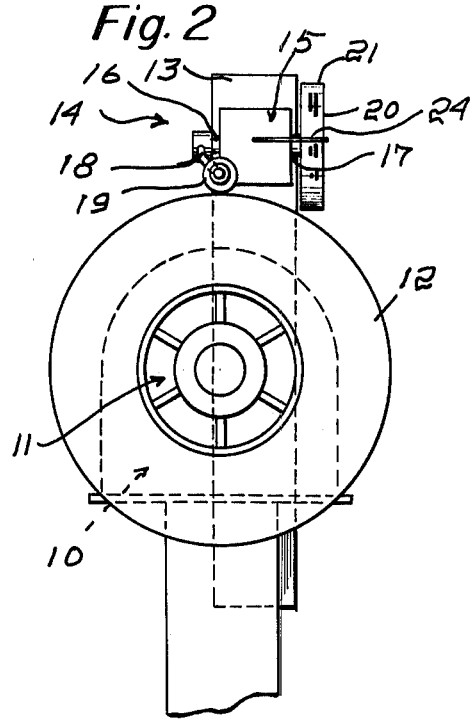
FIG. 2 is a front view of the gauge and builder.

In FIGS. 1 and 2, a section of an extruder builder is generally indicated at 10 and it includes the expansible and rotatable means, generally indicated at 11 by which, when expanded, an inflated, buffed but unbuilt tire 12 is rotatably supported and held centered and sealed then to be automatically inflated. The section 10 is shown as provided with a mount 13 in support of a gauge generally indicated at 14.

The gauge 14 includes a gear box 15 attached to the mount 13 with its drive shaft 16 and its driven shaft 17 horizontal and a predetermined distance above the axis of the tire 12. An arm 18 fixed on the drive shaft 16 has its outer end so positioned that, as it is raised and lowered, it follows a path that is radial with respect to the supported tire 12. The outer end of the arm 18 is shown as provided with a tire-engaging cam 19 that may be rotated relative thereto to enable fine adjustments to be made ensuring gauge accuracy.

Figure 3:
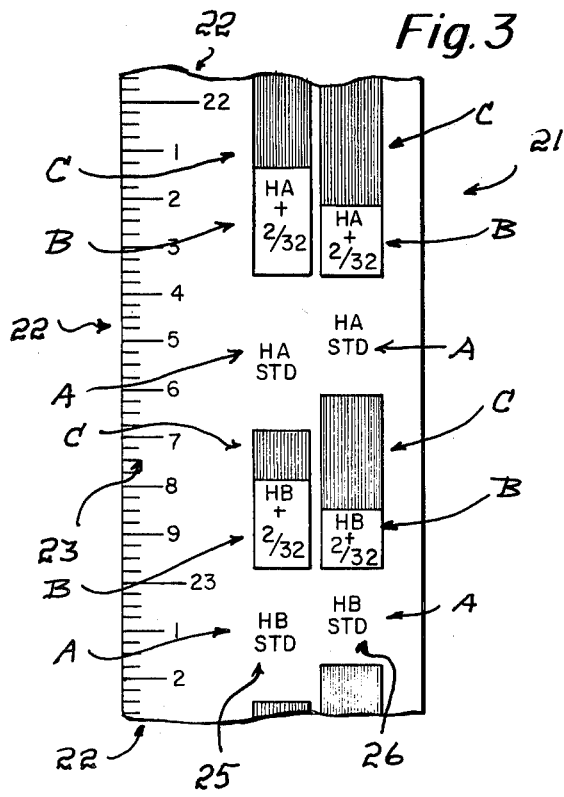
FIG. 3 is a fragmentary plan view, on a substantial increase in scale, showing gauge data.

The driven shaft 17 of the gear box 15 has a drum 20 fixed thereon and provided with a scale 21 divided into a series of portions 22. Reference is now made to FIG. 3 wherein that portion 22 of the scale is shown that is for use with the tire 12 or other tires of the same size. Each portion of the scale 21 has a series of graduations 23, those of the portion 22 between twenty-two and twenty-three inch markers. A fixed pointer 24, see FIGS. 1 and 2, is positioned to overlie the scale 21 to enable it to be read in whatever position into which it is turned when the cam 19 is brought into engagement with the periphery of the tire 12.

At this point, it should be noted that tire constructions, the biased, belted tires and radials, vary with resulting variations in elasticity requiring, accordingly, that the scale for each tire size be useable with different constructions but, in general, biased types do not need to be gauged. Each portion of the scale, the portion 22 has, by way of example, two spaced sets of indicia, the set 25 for fabric belted tires and the set 26 for the less elastic steel belted tires. Each set has at least three sections each of which relates to a buffed tire 12 with a predetermined thickness of uncured rubber built thereon, to a conventional matrix, not shown of particular dimensions.

The section A of each set establishes that with the extruder builder adjusted to build up uncured rubber on the tire 12 to a predetermined standard thickness, a readout in that section assures that the particular matrix may be used. A readout in the section B establishes that the matrix should not be used unless a predetermined thicker layer of uncured rubber is applied, 2/32nd of an inch, for example, is added. In that event, it is only necessary to make a simple adjustment by which the thickness of the extruded uncured rubber is appropriately increased. A readout in the section C of either set warns that the tire 12 should not be used with that matrix. The section C could be divided to show that a further additional thickness should be added if that tire is to be used with the selected matrix if production conditions permitted a change in curing time. A tire that cannot or should not be used with the selected matrix size may be used with the appropriate next larger or next smaller matrix, as the case may be, if such larger or smaller sized matrix is available. For most purposes, a single reading is taken at one location on the periphery of the tire so that a tire need not be rotated while being gauged although the ability to rotate a tire while being gauged is a desirable feature.

The tire 12 is thus accurately gauged while inflated and mounted on the extruder builder, and once a readout is made, the tire 12 is either set aside or, as is usually the case, readied for curing in the matrix by the operation of the extruder builder in the manner indicated by the scale readout.

Figure 4:
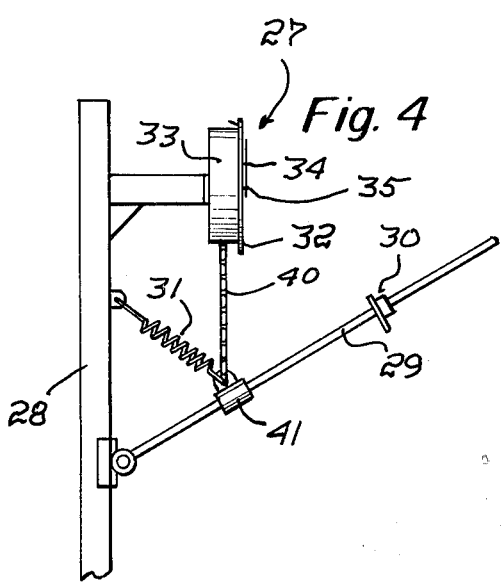
FIG. 4 is a side view of a gauge in accordance with another embodiment of the invention.
Figure 5:
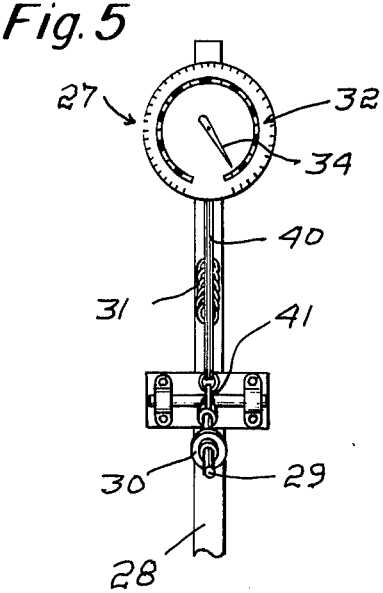
FIG. 5 is a front view thereof.
Figure 8:
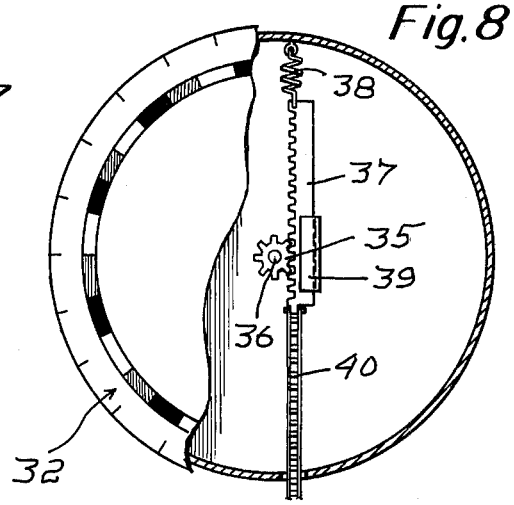
FIG. 8 is a partly sectioned front view, on an increase in scale of the gauge shown in FIGS. 1-4.

In the embodiment of the invention illustrated by FIGS. 4, 5, and 8, the gauge, generally indicated at 27, has a mount 28 to which the arm 29 is pivotally connected. The arm 29 is provided with a rotatable, adjustable cam 30 and is yieldably held in a raised, inoperative position by a spring 31 connecting it to the mount 28.

The scale 32 is shown as arcuate and on the face of a housing 33 fixed on the upper end of the mount 28 and provided with a pivotable pointer 34 the pivot 35 for which is concentric with the scale 32 and is provided with a pinion 36 in mesh with a rack 37 urged in one direction by a spring 38 and slidably held by a guide 39. A chain 40 is attached to the rack 37 and has its other end attached to the arm 29 by a connector 41 the position of which may be varied lengthwise thereof for adjusting purposes. As the scale 32 is or may be identical to the scale 21 except that it is arcuate, it is not again detailed.

Figure 6:
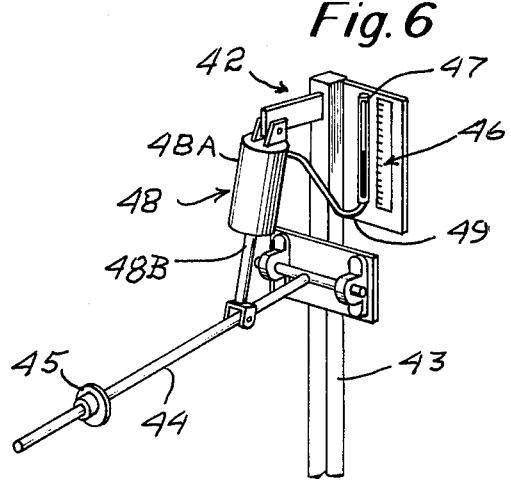
FIG. 6 is a perspective view of a gauge in accordance with another embodiment of the invention.

The gauge 42 illustrated by FIG. 6 has a mount 43 to which the arm 44 is pivotally connected and the arm is provided with a rotatable tire-engaging cam 45. At one side of the mount 43 there is a vertically positioned linear scale 46 adjacent to which the mount supports a vertical tube 47. A piston-cylinder unit 48 has its cylinder 48A pivotally connected to the mount 43 and its piston stem 48B pivotally connected to the arm 44. The unit 48 is filled with a colored liquid and has a conduit 49 effecting communication between its cylinder and the lower end of the tube 47. With the unit 48 charged with a colored liquid, the level of the liquid in the tube 47 follows the movements of the arm 44 but with substantial amplification because of the difference in the cross sectional area of the tube 47 and the cylinder 48A. As the scale 46 is or may be identical to the scale 21 except that it is linear, it is not detailed.

Figure 7:
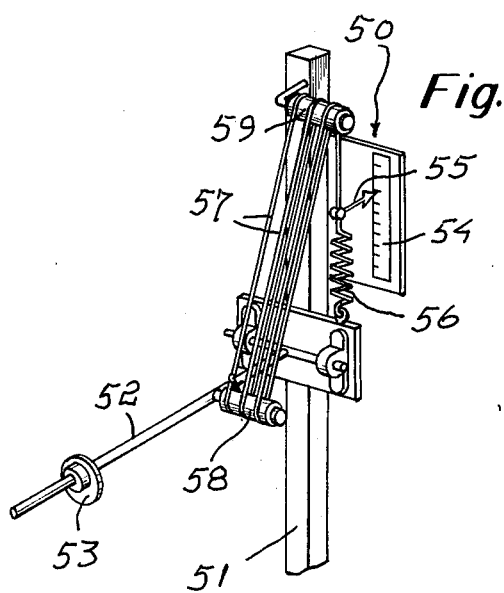
FIG. 7 is a like view of yet another embodiment of the invention.

The gauge 50, illustrated by FIG. 7, has a mount 51 to which the arm 52, provided with a tire-engaging cam 53, is pivotally connected. The mount supports a scale 54 that may be identical to the scale 46. A pointer 55 is provided that is to be moved from end-to-end of the scale 54, in one direction by the return spring 56 and in the other direction by a cable 57 having several passes about pulleys 58 and 59, the pulley 58 carried by the arm 52 and the pulley 59 attached to the upper end of the mount 51. One end of the cable 57 is anchored while its other end is connected to the pointer 55.

Figure 9:
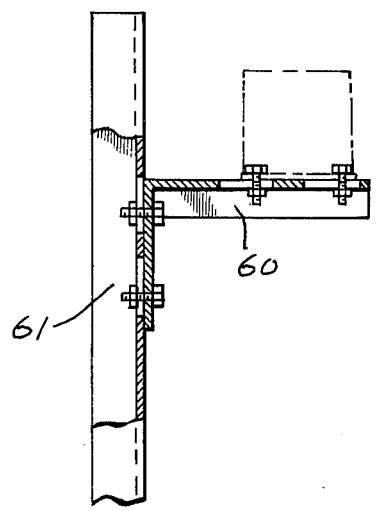
FIG. 9 is a fragmentary side view of an adjustable gauge mount.

In order that the scale graduations may be large in relation to small changes in the diameter of tires, suitable amplification is provided by the gear ratio established by the gear box of FIGS. 1 and 2, the ratio provided by the rack and pinion of FIGS. 4, 5, and 8, the relation in the cross section of the cylinder 48A to that of the tube 47, see FIG. 6, and the number of passes of the tackle used in the embodiment of the invention illustrated by FIG. 7. Amplifications in the order of from 5 to 1 to 10 to 1 are adequate to ensure easy and accurate readouts.

Where gauges in accordance with the invention are a part of an extruder builder or an attachment for a particular extruder builder, adjustments of the tire-engaging cams may be made if necessary for gauge accuracy. Where gauges are attachments, it is preferred that the gauges be adjustable relative to their mounts. By way of example, the gear box of the embodiment of the invention illustrated by FIGS. 1 and 2 may, see FIG. 9, instead of being secured directly to the mount 13, be bolted through lengthwise slots in the flanges of a support 60 for mount lengthwise thereof, and the support 60 may be bolted through lengthwise slots in flanges of the mount 61 for vertical mount relative thereto.

I claim:

1. Apparatus for use in measuring the diameter of a tire of a particular nominal size that has been buffed and is to be provided with a predetermined thickness of uncured rubber applied by an extruder builder and then to be placed and cured in a particular matrix, said apparatus including a support including a mount on which said tire is held during testing, an arm connected to said support for movement into and out of engagement with the periphery of the tire along a path that is generally radial with respect to the axis of the tire on said mount, scale means, said scale means provided with a series of successive portions, each for a particular nominal tire diameter, and each portion provided with a series of successive sections all relating to the actual diameter of the buffed tire with the addition thereto of said predetermined thickness of uncured rubber to be cured in said matrix, one section establishing that the buffed tire diameter is such as to enable said predetermined thickness of uncured rubber to be added and the matrix used, another establishing that the diameter is such as to require a predetermined thicker layer of uncured rubber before the matrix can be used and another section establishing that the buffed tire should not be used with said matrix, scale indicator means, one of said means fixed with respect to said support and a connection between the other means and said arm operable to move said other means relative to said one means and when the arm is in engagement with the periphery of said tire providing an indication in the appropriate section of the appropriate portion of the scale means.

2. The apparatus of claim 1 in which each portion of the scale means is divided to provide a plurality of series of corresponding sections, each series being for a tire the construction of which results in a degree of elasticity differing from that of a tire of another construction.

3. The apparatus of claim 1 in which the mount of the suppport is rotatable.

4. The apparatus of claim 1 in which the support is an extruder builder.

5. A gauge for use in measuring the diameter of a tire of a particular nominal size that has been buffed and is to be provided with a predetermined thickness of uncured rubber applied by an extruder builder with the buffed tire rotatably supported thereby, the tire then to be placed and cured in a particular matrix, said gauge including a mount by which it may be attached to said builder in a predetermined position relative to the axis of the tire when supported by said builder and including an arm connected to said gauge for movement into and out of engagement with the periphery of the tire along a path that is generally radial with respect to the axis of a tire supported by said builder, scale means, said scale means provided with a series of successive portions, each for a particular nominal tire diameter, and each portion provided with a series of successive sections all relating to the actual diameter of the buffed tire with the addition thereto of said predetermined thickness of uncured rubber to be cured in said matrix, one section establishing that the buffed tire diameter is such as to enable said predetermined thickness of uncured rubber to be added and the matrix used, another establishing that the diameter is such as to require a predetermined thicker layer of uncured rubber before the matrix can be used and another section establishing that the buffed tire should not be used with said matrix, and scale indicator means, one of said means fixed with respect to said mount and a connection between said other means and said arm operable to move said other means relative to said one means and when the arm is in engagement with the periphery of said tire providing an indication in the appropriate section of the appropriate portion of the scale means.

6. The gauge of claim 5 in which each portion of the scale means is divided into a plurality of corresponding series of sections, each series being for a tire the construction of which results in a degree of elasticity differing from that of a tire of another construction.

7. The gauge of claim 5 in which the scale means is fixed and the other means is connected to the arm.

8. The gauge of claim 5 in which the scale means is connected to the arm and the other means is fixed.

9. The gauge of claim 5 in which there is a fixed gear box including a drive shaft and a driven shaft, the arm is attached to the drive shaft, the scale means is a drum fixed on the driven shaft, and the scale indicator means is fixed.

10. The gauge of claim 5 in which the scale means is arcuate and fixed, the scale indicator means is a pivotable pointer with the pivot axis concentric with said scale means and the connection includes a pinion rotatable with the pointer, a rack in mesh therewith, a chain connected to the rack, means connecting the chain to the arm, and a spring yieldably opposing movement of the rack toward said arm.

11. The gauge of claim 10 in which the chain connecting means is adjustable lengthwise of the arm.

12. The gauge of claim 5 in which the scale means is vertical and fixed, the other means includes a vertical tube adjacent the scale means, a liquid charged piston cylinder unit the cylinder of which is with respect fixed to said mount and the piston of which is connected to the arm, and a conduit effecting communication between the cylinder and the lower end of said tube.

13. The gauge of claim 5 in which the scale means is vertical and fixed, the other means includes a pointer disposed to traverse the scale means, a spring yieldably urges said pointer in one direction, and the connection includes a fixed pulley, a pulley carried by the arm and a flexible element is trained about said pulleys with a plurality of passes, one end of the element fixed to one pulley and the other end connected to said pointer, movement of the arm into contact with the tire exerting a pull on the flexible element against the resistance of said spring.

14. The gauge of claim 5 and a tire-engaging cam rotatably mounted on said arm as a gauge adjustment.

* * * * *